United States Patent [19]

Takenawa et al.

[11] Patent Number: 4,830,871

[45] Date of Patent: May 16, 1989

[54] NEW SOYA FLAKES AND A PROCESS FOR PREPARATION THEREOF

[75] Inventors: Seishi Takenawa, Nara; Toshinori Shiomi; Motoko Yamochi, both of Toyonaka, all of Japan

[73] Assignee: Fujisawa Pharmaceutical Co., Ltd., Osaka, Japan

[21] Appl. No.: 98,228

[22] Filed: Sep. 18, 1987

[30] Foreign Application Priority Data

Oct. 3, 1986 [JP] Japan ................................ 61-236880

[51] Int. Cl.$^4$ .......................... A23L 1/20; A23L 1/09; A23L 1/164; A23L 1/36

[52] U.S. Cl. .................................... 426/634; 426/618; 426/619; 426/620; 426/621; 426/629

[58] Field of Search ............... 426/634, 618, 619, 629, 426/620, 621, 622

[56] References Cited

U.S. PATENT DOCUMENTS

| | | |
|---|---|---|
| 2,278,465 | 4/1942 | Musher et al. ...................... 426/618 |
| 2,436,519 | 2/1948 | Luke .................................... 426/621 |
| 2,478,438 | 8/1949 | Thompson et al. ................. 426/629 |
| 3,318,705 | 5/1967 | Clausi et al. ........................ 426/621 |
| 3,554,763 | 1/1971 | Fast et al. ............................ 426/620 |
| 3,687,686 | 8/1972 | Bedenk ............................... 426/634 |
| 3,687,687 | 8/1972 | Liepa .................................. 426/634 |
| 3,753,728 | 8/1973 | Bedenk et al. ...................... 426/634 |
| 3,996,384 | 12/1976 | Reesman et al. .................... 426/621 |
| 4,140,803 | 2/1979 | Panchuk et al. ...................... 426/93 |

Primary Examiner—Donald E. Czaja
Assistant Examiner—Helen Pratt
Attorney, Agent, or Firm—Oblon, Fisher, Spivak, McClelland & Maier

[57] ABSTRACT

The invention relates to soya flakes obtainable by kneading a mixture of soya flour and a partial hydrolyzate of starch having a DE value of 10 to 60 in a proportion of 20 to 100% by weight relative to the soya flour, with addition of water, molding the resulting paste and baking the same, and to a process for the preparation of said soya flakes.

8 Claims, No Drawings

NEW SOYA FLAKES AND A PROCESS FOR PREPARATION THEREOF

This invention relates to a novel flaky food composed predominantly of soya, and more particularly to soya flakes obtainable by kneading a mixture of soya flour and a partial hydrolyzate of starch with addition of water, molding the resulting paste and baking the same.

Flaky foods based on starch, such as corn flakes, brown rice flakes, etc., are well known but no flaky food based on protein is known.

The production of a flaky food calls for entrapment of tiny air cells in a dough so as to let the air cells cause a uniform swelling of the dough upon baking to an appropriate consistency but the use of soya flour alone does never yield such a flaky food, nor does a mixture of soya flour with starch give a flaky food.

The present inventors conducted an extensive study to produce a flaky food from soya which is mainly composed of highly nutritional protein and discovered that a flaky food can be obtained by adding a partial hydrolyzate of starch to soya flour, kneading the mixture with water, molding the resulting paste, and baking the same. The finding was followed by further research, which has resulted in the development of this invention.

The soya flour which is employed in the production of soya flakes according to this invention may be any milled product of the soya and may be exemplified by skinned soya flour, soya milk powder, defatted soya flour, soya protein concentrate, isoelectrically fractionated soya protein and so on.

The partial hydrolyzate of starch may include one with DE (Dextrose Equivalent) value not less than 5, preferably 10-60 and may for example be dextrin, glucose syrup such as malt syrup, or the like. The dextrin may be any of water-soluble dextrins, although one with a DE value not less than 5 is generally preferred and one with a DE value 10-60 is more preferable. The glucose syrup may for example be acid saccharification syrup, enzyme saccharification syrup, powdered glucose syrup, reduced starch hydrolyzate, reduced maltose syrup or the like, although one with a DE value not less than 5 is generally preferred and one with DE value 10-60 is more preferable.

The relative proportion of soya flour and partial hydrolyzate of starch depends on the type of partial hydrolyzate of starch used. Taking ordinary dextrin (DE value: $\geq 5$) as an example, it is preferably used in a proportion of 20 to 100 percent (weight %; the same applies hereinafter) relative to soya flour. Glucose syrup is preferably used in a proportion of about 20 to 100 percent in terms of solids relative to soya flour.

The soya flakes according to this invention as prepared in formulation with various additives can be tailored to the specific quality demands in regard to flavor, texture and so on. Thus, the addition of one or more members of gluten, whole egg powder, egg yolk powder, egg white powder and so on in small quantities results in variations in the flavor and texture of the product soya flakes. The texture of the flakes can also be modified by adding small amounts of one or more members of guar gum, xanthan gum, carrageenin, methylcellulose, carboxymethylcellulose, locust bean gum, gum arabic and so on.

The soya flakes manufactured according to this invention with addition of calcium gluconate (for example at the level of 3 to 15% based on soya flour) offer a good texture on reconstitution with milk, for instance. Therefore, the addition of calcium gluconate is a recommended practice.

Further, soya flakes having various flavors can be manufactured by adding various nutritional enriching agents such as vitamins, minerals, etc., flavorants, food colors, condiments, and so forth.

The soya flakes according to this invention are manufactured by the following production process.

To a mixture of soya flour and a partial hydrolyzate of starch is added about 10 to 80 percent of water and the mixture is kneaded. The resulting paste is rolled to a suitable thickness (for example, about 1 to 3 mm), cut to size, and baked at a temperature of about 100° to 300° C. until the surface of the texture is browned to a yellow to tan shade. In this operation, it is preferable that the baking results in a swelling of the texture and dehydration of the texture to its core. To assure this result, one may control the moisture content of the dough cuttings, baking temperature and/or time, etc. or pre-dry the cuttings before baking. If the texture is not fully dehydrated even though its surface is appropriately browned, the baked flakes may be subsequently dried to give a more satisfactory soya flaky food.

The soya flakes according to this invention have the same texture as the conventional starch-based flakes but quite unlike the latter, are novel protein-based flakes of high nutritional value.

The effects of this invention are apparent from the following test example.

TEST EXAMPLE

Sample 1, Sample 2 (soya flakes of this invention) and Sample 3 (soya flakes of this invention) were manufactured.

Sample 1:

To 1 kg of skinned soya flour were added 700 g of wheat starch and 300 ml of water and the mixture was kneaded in a mixer. The resulting paste was molded into a sheet by means of a uniaxial extruder (exit temperature: 130° C.) and cut to about 1 cm square. The dough cuttings were baked in a gas oven (150° C.) for 3 minutes and dried at 80° C. for 30 minutes to give 1500 g of Sample 1.

Sample 2 (soya flakes of this invention):

The production procedure for Sample 1 was repeated except that 700 g of dextrin (DE value: 10-16) was used in lieu of wheat starch to give 1500 g of Sample 2.

Sample 3 (soya flakes of this invention):

The production procedure for Sample 1 was repeated except that 700 g of glucose syrup (DE value: 35.8) (water content: 25%) was used in lieu of wheat starch to give 1500 g of Sample 3.

The above Samples 1 to 3 were organoleptically evaluated by the panel test using 10 panelists against the following Controls 1 and 2 to which the scores of 1 and 5 were respectively assigned. The results in terms of mean scores are shown below in the table.

Control 1: Manufactured from skinned soya flour alone in the same manner as Sample 1.

Control 2: Commercial corn flakes [Kellogg's Corn Flakes, distributed by Ajinomoto Co., Inc.]

| Score | Evaluation |
| --- | --- |
| 5 | Comparable to the commercial product |
| 4 | Slightly inferior to the commercial |

|   | -continued |
|---|---|
|   | product but not objectionable at all |
| 3 | Inferior to the commercial product but having been markedly improved |
| 2 | Fairly inferior to the commercial product but having been slightly improved |
| 1 | No improvement at all |

| Sample | 1 | 2 | 3 |
|---|---|---|---|
| Score | 1.0 | 3.7 | 4.2 |

Examples of this invention are given below.

EXAMPLE 1

To 1 kg of defatted soya flour were added 700 g of glucose syrup [brand name: Nisshoku Mizuame; Japan Maise Product Co., Ltd.] (DE value: 35.8) (water content: 25%) and 300 ml of water and the mixture was kneaded in a mixer, rolled into a sheet on a roll with a nip distance of 1 mm, and cut to about 1 cm square. The cuttings were dried at 100° C. for 30 minutes and put in a stainless steel cylindrical cage. With the cage being rotated in an electric oven at 200° C., the cuttings were baked for 1 minute to give about 1.5 kg of soya flakes.

EXAMPLE 2

To 1 kg of skinned soya flour were added 500 g of dextrin [brand name: Amycol No. 6 L; Nippon Starch Chemical Co., Ltd.] (DE value: 10-16) and 700 ml of water and the mixture was kneaded in a mixer and extruded into a sheet by means of a single screw extruder (exit temperature: 130° C.). The sheet was cut to about 1 cm square, baked in a gas oven (150° C.) for 3 minutes, and dried at 80° C. for 30 minutes to give about 1.5 kg of soya flakes.

EXAMPLE 3

To 1 kg of skinned soya flour were added 600 g of glucose syrup [brand name: Nisshoku Mizuame; Japan Maize Product Co., Ltd.] (DE value: 35.8) (water content: 25%) and 700 ml of water and the mixture was kneaded in a mixer. The resulting paste was molded into a sheet by means of a single screw extruder (exit temperature: 130° C.) and cut to about 1 cm square. The cuttings were baked in a gas oven (150° C.) for 3 minutes and, then, dried at 80° C. for 30 minutes to give about 1.5 kg of soya flakes.

EXAMPLE 4

To 1 kg of skinned soya flour were added 700 g of glucose syrup [brand name: Nisshoku Mizuame; Japan Maize Product Co., Ltd.] (DE value: 35.8) (water content: 25%), 60 g of calcium gluconate and 700 ml of water. After kneading, the resulting paste was further processed in the same manner as Example 2 to give about 1.7 kg of soya flakes.

We claim:

1. Soya flakes obtainable by kneading a mixture of soya flour and a partial hydrolyzate of starch having a DE value of 10 to 60 in a proportion of 20 to 100% by weight relative to the soya flour, with addition of water, molding the resulting paste and baking the same.

2. Soya flakes according to claim 2, wherein the partial hydrolyzate of starch is a water-soluble dextrin.

3. Soya flakes according to claim 1, wherein the partial hydrolyzate of starch is a glucose syrup.

4. A process for preparation of soya flakes which comprises kneading a mixture of soya flour and a partial hydrolyzate of starch having a DE value of 10 to 60 in a proportion of 20 to 100% by weight relative to the soya flour, with addition of water, molding the resulting paste and then baking the same.

5. A process according to claim 4, wherein the partial hydrolyzate of starch is a water-soluble dextrin.

6. A process according to claim 4, wherein the partial hydrolyzate of starch is a glucose syrup.

7. Soya flakes obtainable by kneading a mixture of soya flour, a partial hydrolyzate of starch having a DE value of 10 to 60 in a proportion of 20 to 100% by weight relative to the soya flour, and other additives with addition of water, molding the resulting paste and baking the same.

8. A process for preparation of soya flakes which comprises kneading a mixture of soya flour, a partial hydrolyzate of starch having a DE value of 10 to 60 in a proportion of 20 to 100% by weight relative to the soya flour, and other additives with addition of water, molding the resulting paste and then baking the same.

* * * * *